G. T. WARWICK.
MACHINE FOR SLOTTING AND SHAPING THE HEADS OF SCREWS.
APPLICATION FILED DEC. 31, 1909.
1,099,678.
Patented June 9, 1914.
7 SHEETS—SHEET 5.
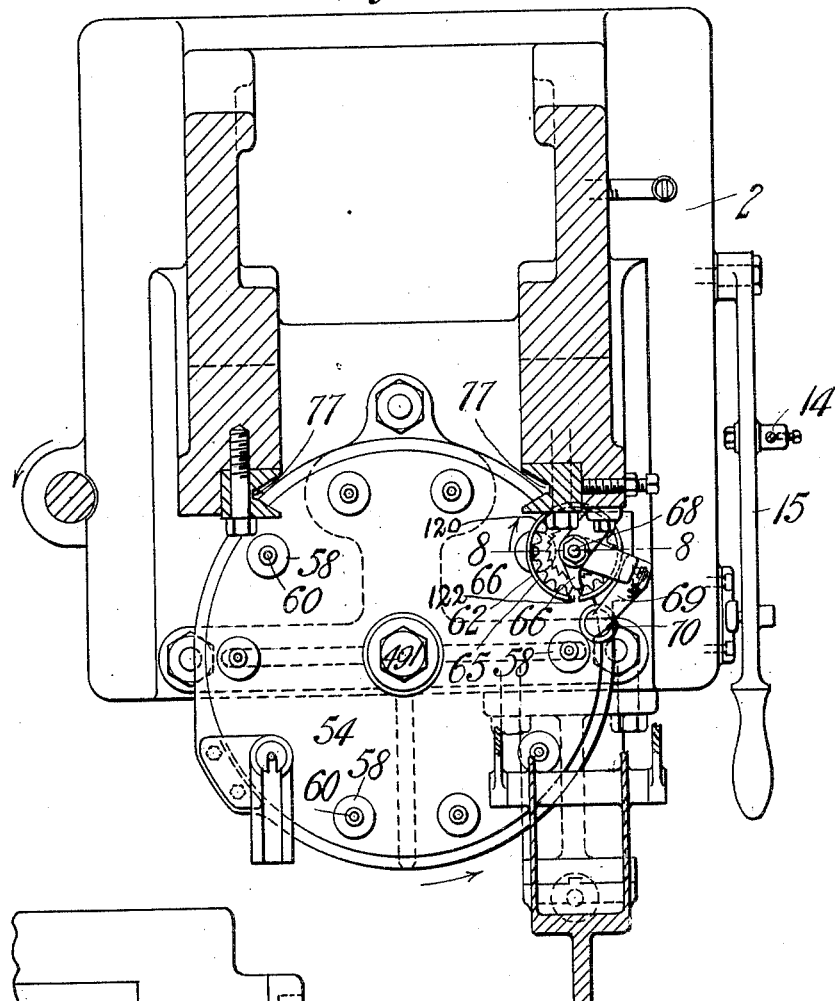
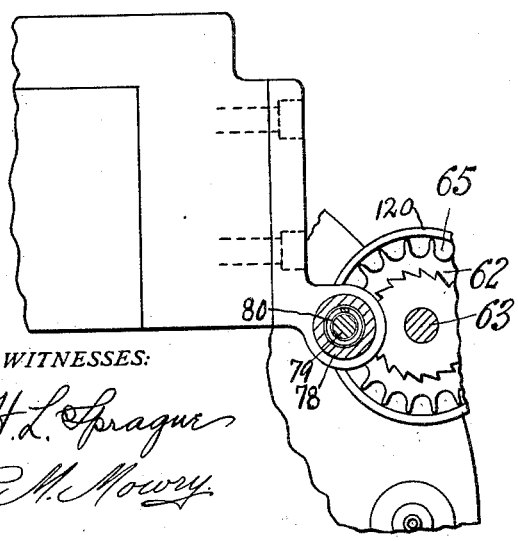
WITNESSES:
H. L. Sprague
R. M. Mowry
INVENTOR.
George T. Warwick
BY
ATTORNEY.

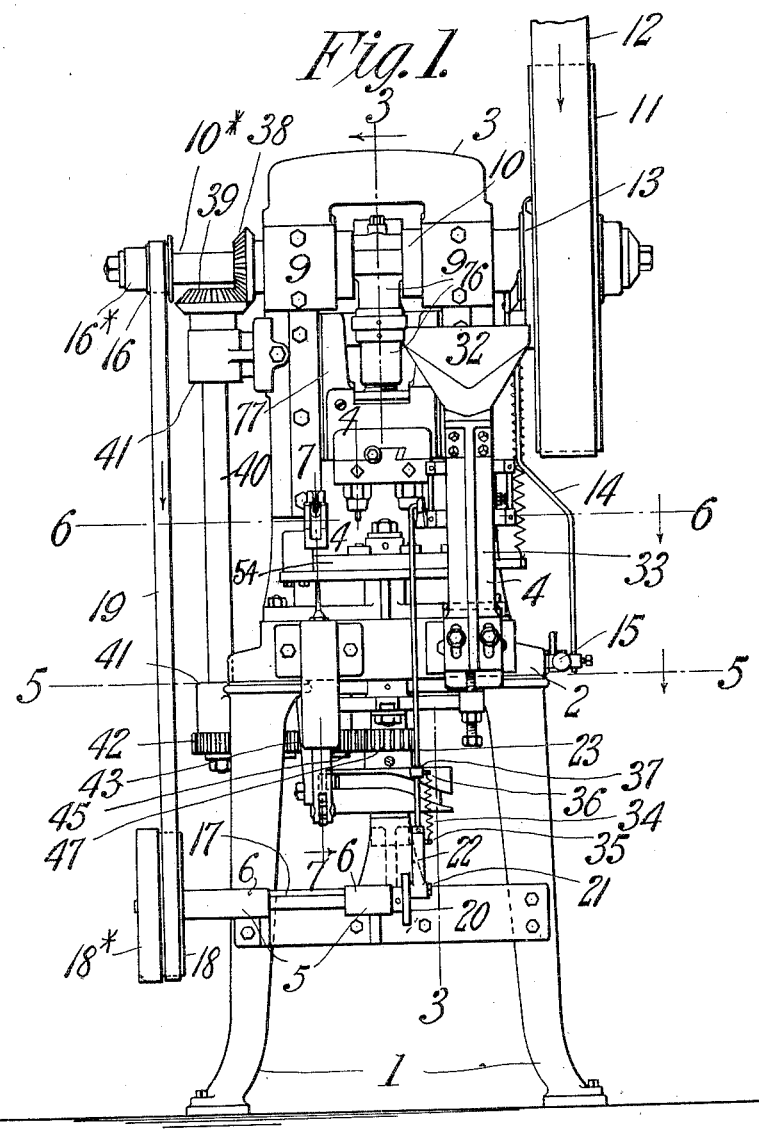

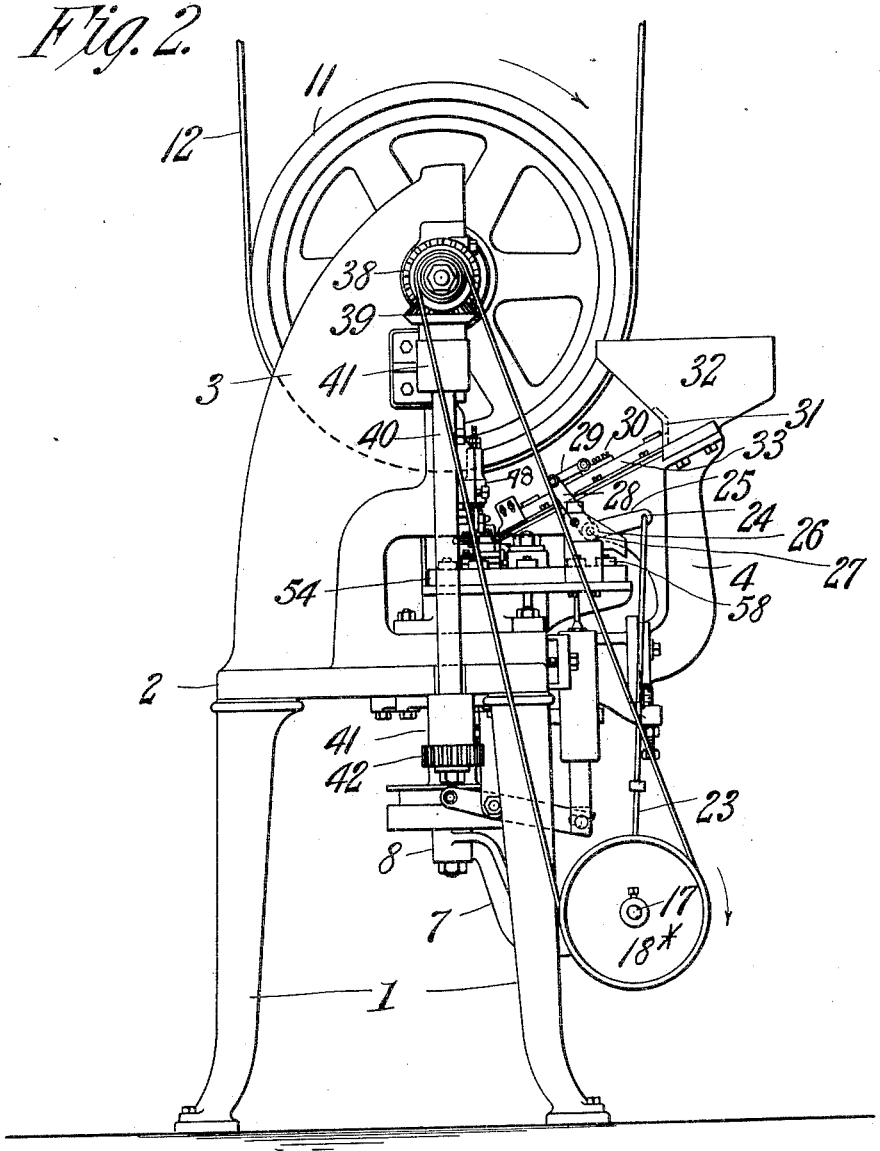

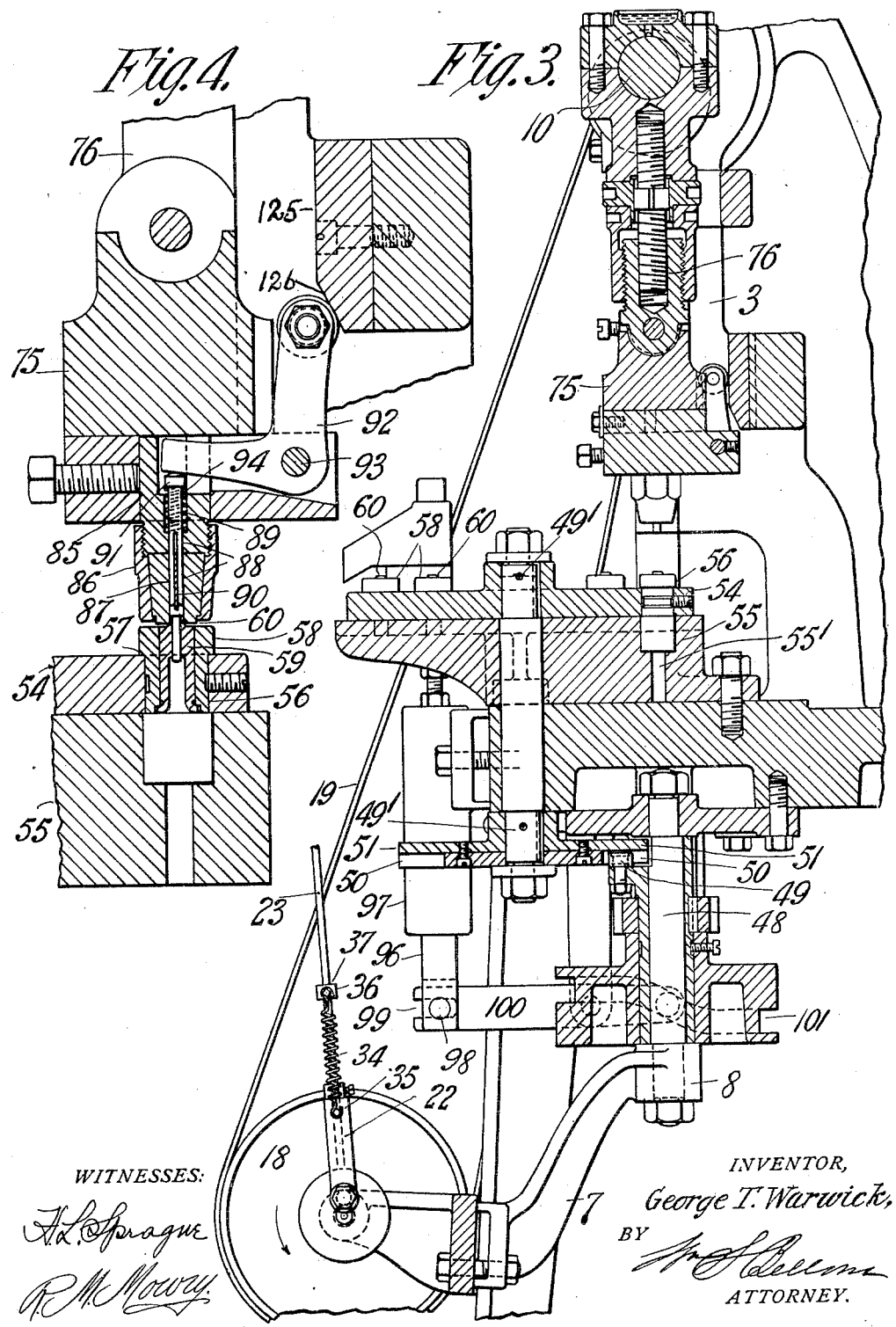

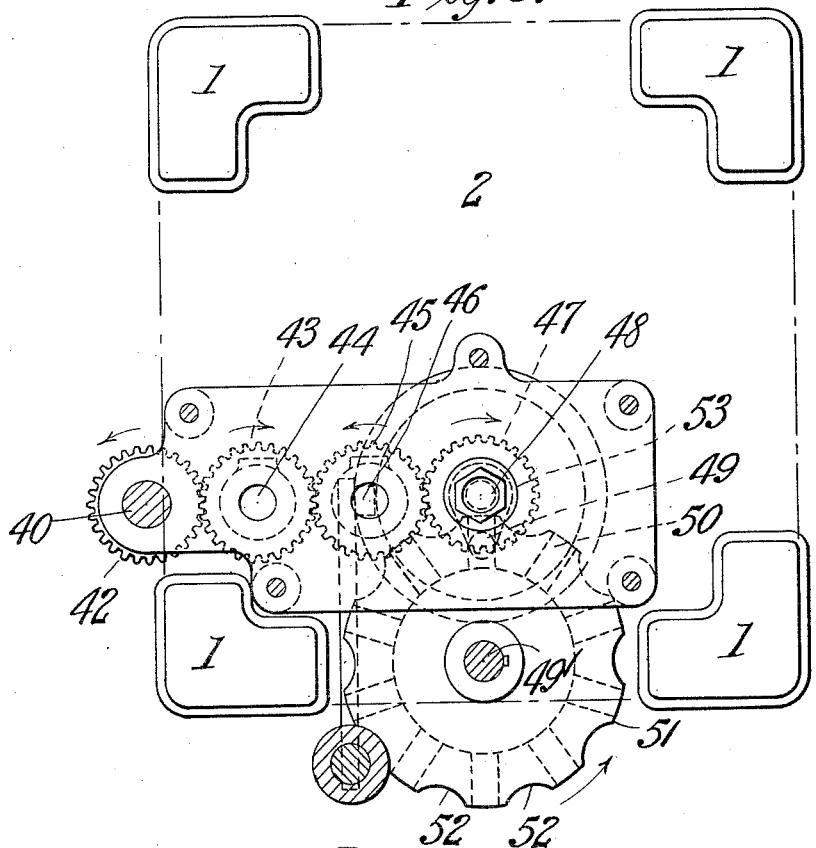

G. T. WARWICK.
MACHINE FOR SLOTTING AND SHAPING THE HEADS OF SCREWS.
APPLICATION FILED DEC. 31, 1909.

1,099,678.

Patented June 9, 1914.
7 SHEETS—SHEET 6.

WITNESSES:
H. L. Sprague
R. H. Mowry

INVENTOR,
George T. Warwick,
BY
ATTORNEY.

G. T. WARWICK.
MACHINE FOR SLOTTING AND SHAPING THE HEADS OF SCREWS.
APPLICATION FILED DEC. 31, 1909.
1,099,678.
Patented June 9, 1914.
7 SHEETS—SHEET 7.
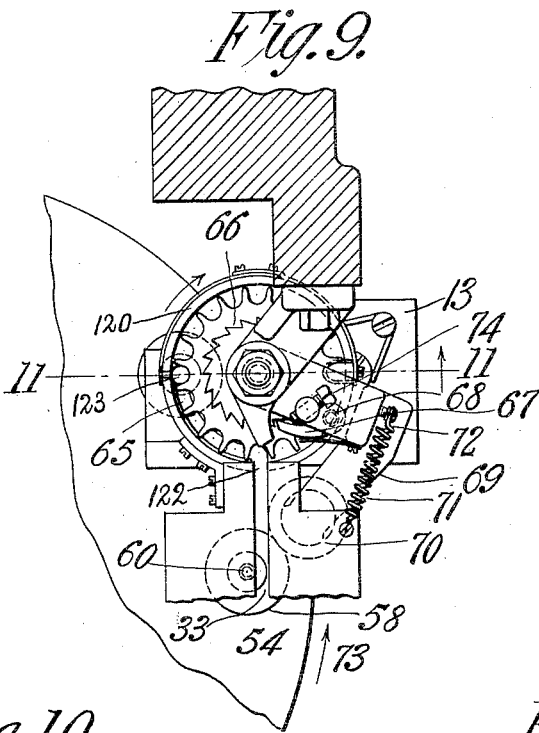
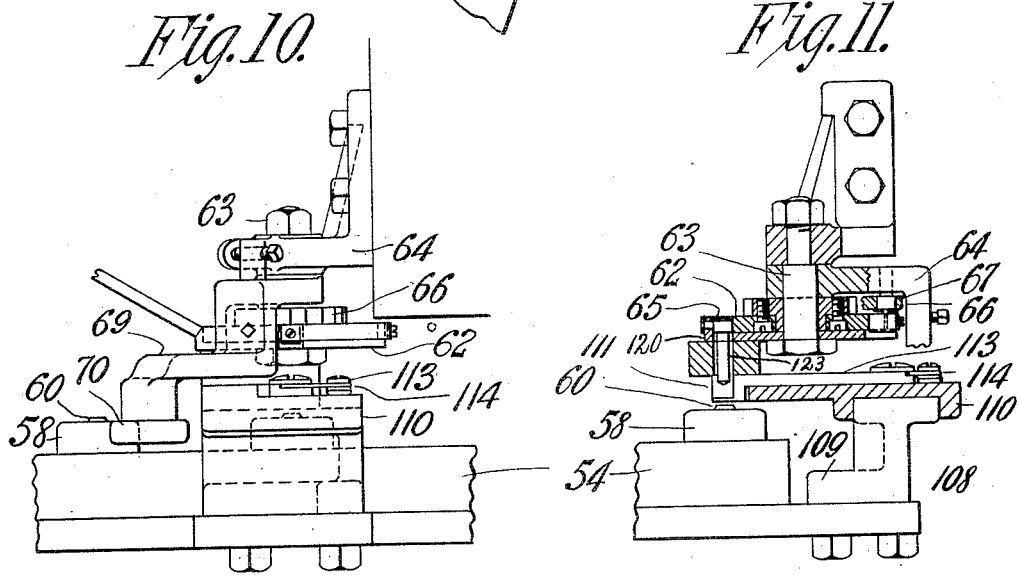
WITNESSES:
H. L. Sprague
R. M. Mowry
INVENTOR,
George T. Warwick,
BY
ATTORNEY.

UNITED STATES PATENT OFFICE.

GEORGE T. WARWICK, OF SPRINGFIELD, MASSACHUSETTS.

MACHINE FOR SLOTTING AND SHAPING THE HEADS OF SCREWS.

1,099,678.

Specification of Letters Patent. Patented June 9, 1914.

Application filed December 31, 1909. Serial No. 535,755.

*To all whom it may concern:*

Be it known that I, GEORGE T. WARWICK, a citizen of the United States of America, and resident of Springfield, in the county of Hampden and State of Massachusetts, have invented certain new and useful Improvements in Machines for Slotting and Shaping the Heads of Screws, of which the following is a full, clear, and exact description.

My invention relates to improvements in machines for slotting screws, and the objects of my invention are the provision of a machine which will, in a very rapid and perfect manner, form the slot in the head of the screws; which machine is capable of easy management or manipulation, is compact, strong and durable, and thoroughly efficient and practical from every point of view.

To attain the desired objects the invention consists of a machine for slotting screw heads embodying in combination means for supplying the screw blanks, means for feeding the blanks, means for forming the slot in the head of the screws, and means for discharging and delivering the blanks with the heads slotted.

The invention further consists of a machine for slotting screw heads embodying novel features of construction, and combination and arrangement of parts for service substantially as disclosed herein.

In order that the details of construction and the operation of my machine may be fully understood and its many advantages appreciated, I have illustrated in the accompanying drawings a machine embodying my invention, it being understood that many changes or modifications may be made therein that come within the scope of my invention.

Figure 7:
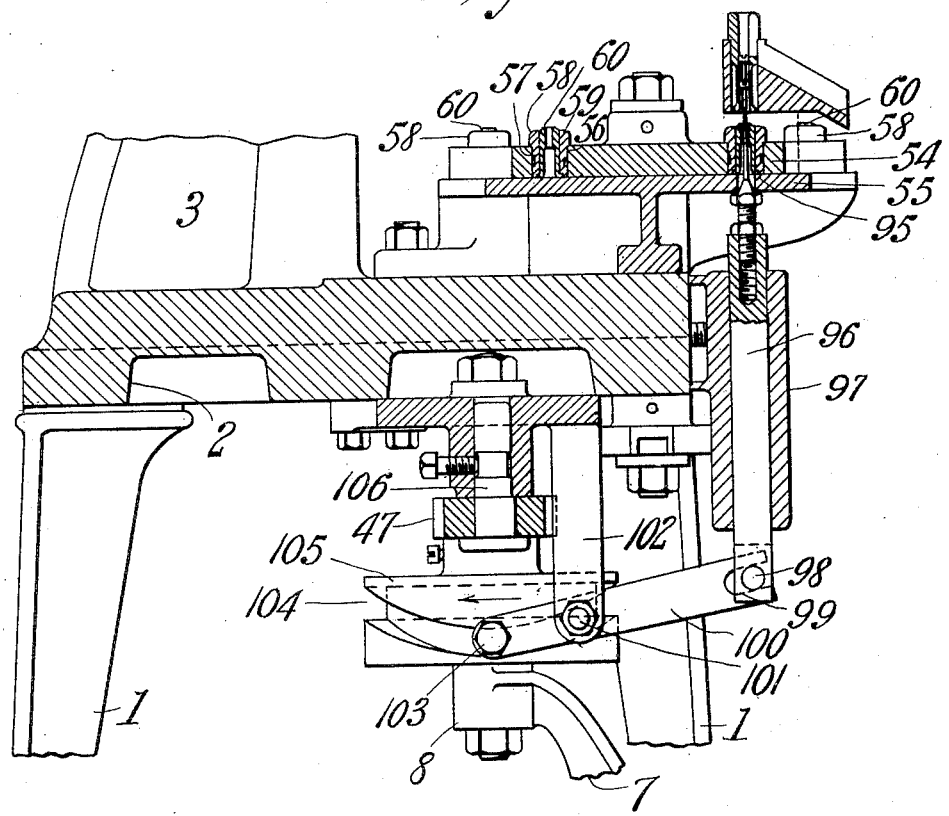
Figure 13:
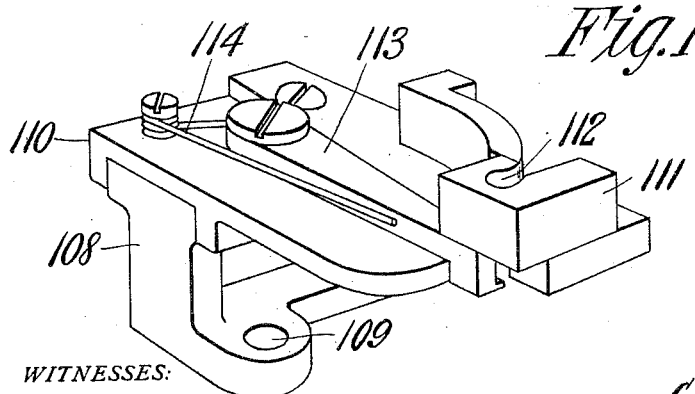

Figure 1 represents a front elevation of my complete machine for forming slots in the heads of screws; Fig. 2 represents a side elevation of the complete machine taken from the left side of the machine; Fig. 3 represents a sectional view on line 3—3, Fig. 1, the parts therein shown being on a larger scale; Fig. 4 represents a sectional view on line 4—4, Fig. 1, showing in enlarged detail the screw blank holder with blank in position and the movable members with slotting blade or former and slotting blade actuating means. Fig. 5 represents a sectional view on line 5—5, Fig. 1, showing particularly the system of gearing, the star wheel and cam operating in conjunction therewith and the relation of the legs or supports of the table. Fig. 6 represents a sectional view on line 6—6 of Fig. 1, illustrating mainly the revolving table or turret with blank holders and the feeding mechanism. Fig. 7 represents a sectional view on line 7—7 of Fig. 1, showing the blank after being slotted, the ejector for discharging the blank and operating means for the ejector. Fig. 8 represents a sectional view on line 8—8 of Fig. 6, detailing the feed mechanism and injector for conveying the blank from the feeding disk or wheel to one of the holders or carriers. Fig. 9 represents a top plan view of the feeding mechanism and part of the delivery chute, turret and actuating means of the feeding mechanism. Fig. 10 represents a side view of the feeding mechanism and a part of the turret illustrating the manner of engagement of the blank holder with the feed actuating means. Fig. 11 represents a sectional view of the feeding mechanism and relative parts, taken on line 11—11, of Fig. 9. Fig. 12 represents a sectional view of the injector on line 12—12, Fig. 8; and Fig. 13 represents an enlarged detail perspective of the screw guide under the feeding mechanism.

Referring by numerals to the drawings, in which similar numerals are employed to designate corresponding parts in the several views:—The frame work or supporting structure consists of the legs 1, the table or platform 2 mounted thereon, the vertical arch 3 rising from the table, the supply hopper supporting bracket 4, the brackets 5 having transverse shaft bearings 6 and the arm or bracket 7 having a vertical shaft bearing 8, the whole forming a compact, simple and strong supporting structure or frame.

Mounted in transverse bearings 9 of the arch is the cranked shaft 10 having upon one of its extended ends the driving pulley 11, over which passes the driving belt 12; and to stop or permit the revolution of the shaft 10, I employ the friction clutch 13, connected by rod 14 with hand lever 15 all of well known construction. On the other extended end $10^x$ of the shaft 10 is a step or cone pulley 16, $16^*$, running parallel to the shaft 10; and mounted in the bearings 6 of the brackets 5 is the shaft 17 on whose outer end is a similar step or cone pulley 18, $18^*$ with which is combined the driving belt 19. From this construction it is evident that power applied to the driving pulley revolves the shaft and through the medium of the belt and pulleys revolves the lower shaft, and also that the starting or stopping of the machine is under the direct control of the operator.

Upon the inner end of the shaft 17 is a wheel 20 having an eccentrically disposed stud 21 to which is pivoted the sleeve or ferrule 22, in which fits slidingly the lower end of the rod 23, the upper end of which is formed with an arm 24, connected to the angle lever 25, fulcrumed at 26, on the stud 27, and having its upper arms or portions 28 connected by the links 29 to the sliding blank carrier 30, having its upper end passing into the discharge or supply opening 31 of the supply hopper 32, a chute 33 leading from the supply opening of the hopper and conducting the blanks to the feeding mechanism as will presently appear. From this construction it will be seen that the revolution of the shaft 17 revolves the disk or wheel 20, causing the sleeve 22 to move vertically and consequently the rod 23 while rocking the angle lever 25, causes the blank carrier to slide into the hopper to receive a blank, and out of the hopper to deliver the blank to the supply chute 33; and to insure proper movement of the lower end of the rod 23 in the sleeve 22, I employ the spring 34 having its lower end connected to the stud 35 on the sleeve and its upper end connected to the stud 36 on the collar 37, as is evident. Also mounted upon the extended end 10$^x$ of the cranked driving shaft is the vertically disposed bevel pinion 38 which meshes with the similar horizontally disposed bevel pinion 39 carried upon the upper end of the vertical transmission shaft 40 journaled in the vertically disposed bearing brackets 41 secured to the frame of the machine. This transmission shaft extends downward below the bed or table of the frame, and upon its lower end carries the gear wheel 42 meshing with the gear wheel 43 mounted upon a depending stud 44; and said gear wheel 43 meshes with a similar gear wheel 45 mounted upon a depending stud 46; and said gear wheel 45 in turn meshes with a similar gear wheel 47 mounted on a stud 48. From this construction it will be seen that the revolution of the cranked power shaft imparts revolution to the drop or vertical transmission shaft, which through the system of gears 42, 43, 45 and 47, as clearly shown in Fig. 5, and upon the shaft 48 is carried a cam 49 which enters, at regular and determined intervals the radial pockets 50 formed on the underside of what I term the star wheel 51, said wheel having its periphery provided adjacent the radial pockets 50 with curved recesses 52 in which engages the disk 53 carried on the same shaft with the cam 49; and the shaft 49' upon which is mounted the star wheel extends upward above the table of the machine and has mounted thereon the dial or turret 54 which revolves upon the platform 55 mounted upon the table of the machine, said table being provided with vertical openings 56, the purpose of which will presently appear. From this construction it will be understood that rotation is transmitted from the vertical shaft through the system of gears to the star wheel and from thence to the shaft bearing upon its upper end the turret or dial; and the dial has mounted therein and arranged at regular intervals near its edge in openings 56 a series of blank holders or carriers which comprise an outer member 57 fitting in the openings 56 of the turret, said outer member being formed with the shouldered upper portion 58 resting upon the upper edge of the turret; and in said member 57 is fitted the blank receiving sleeve 59 provided with a boss or anvil portion 60 upon which rests the under face of the head 61 of the screw blank.

The revolution of the dial or turret brings the blank holders or carriers under the screw feeding mechanism of my machine, which mechanism consists of a wheel 62 mounted upon a shaft 63 carried by a support 64, said wheel being provided with a series of open peripheral blank receiving pockets 65; and also upon the shaft is a ratchet wheel 66 which is engaged at regular intervals by the spring controlled pawl 67 on the stud or pin 68 secured to the angle lever 69, the inner end of which is mounted upon the shaft carrying the feed wheel, and the other end of said angle lever carries the disk 70 arranged in the path of travel of the blank holders and actuated thereby to impart to the feed wheel through the medium of the pawl 67 and ratchet 68 a step by step movement in order to present at certain and determined intervals the blanks above the holders or carriers to insure the proper feeding of said blanks to the holders or carriers.

The feed wheel, having the spaced recesses in its edge which make the blank receiving pockets, has its location within a circular pan-like appliance 120,—that is one having a horizontal base and an upstanding marginal rim or flange closely outside of the points of the spaced teeth of the wheel which form the pockets. The said rim has an aperture 122 therein in line with the chute way 33, and the base has, about a quarter way around from the recesses 122, a hole 123 through its bottom for the expulsion of screws as will hereinafter appear, in a downward direction into the receiving pockets therefor in the turret or revoluble carrier.

A spring 71 having one end connected to the angle lever at 72 and the other end connected to the hopper at 73 is employed to return the angle lever to normal position after it has been operated upon by the blank holders; and to regulate or adjust the movement of the spring pawl 67 I employ the adjusting screw 74.

The delivery chute 33 leads from the supply hopper directly into the open pockets 65 of the feed wheel; and the blanks pass from the hopper into the chute and into the pockets of the feed wheel with the head of the blank upstanding; and upon the plunger head, or as it is termed in the art the punch gate 75 connected with the crank shaft by means of the connections 76 and guided in vertical ways 77. Upon an extension of the plunger head is secured a tubular casing 78 (Figs. 2, 8 and 12) in which is mounted a slidable rod encircled by a coiled buffer or cushioning spring 80 and having at its lower portion a cylindrical guiding enlargement 81 formed with a depending stem 82, which, upon the descent of the plunger engages the head of the screw blank contained in the open pocket of the feed wheel and expels the blank from such pocket into the blank holder of the dial, as most clearly shown in Fig. 8; and to adjust this expelling device to take up wear and regulate the tension of the spring, I loosen the lock nuts 84, 84, which engage on the threaded plug 83, which by its screw adjustability in the top of the casing 78 may be properly positioned vertically. The plunger head also carries the slotting mechanism of my machine which consists of the sleeve 85 to which is secured the band 86 in which is located the sizing head 87; and through the vertical passage 88 of the sleeve and head passes the plunger 89 which by its slotted lower portion is slidable over the slotting blade 90 which is rigidly held in, and is immovable relatively to the sizing head, substantially as in the devices set forth in Letters Patent of the United States issued to me November 22nd, 1910, No. 976,758, herein referred to, and at its upper end the plunger is formed with a head 91 adapted to be engaged by the angle shock preventing lever 92 fulcrumed at 93 in the punch gate; and to prevent a too sudden impact between the angle lever and the head of the slotting device I place around the pin or stem 89 the coil spring 94, such spring being also effective for normally maintaining the plunger in its upwardly retracted position.

The angle lever in the greater portion of the vertical travel of the plunger has, by the roller at the upper end of its arm 92, a bearing on the straight vertical surface 125 of a fixed part of the frame so that such lever is swung to the reverse of the position shown in Fig. 4 whereby the rod plunger or bar 89 has, and is maintained in, a position somewhat downwardly advanced from that shown in said view; but when an extreme downward limit of the plunger 25 is being reached the roller stud of the angular lever rides outwardly on the cam surfacing 126 which is a continuation of the aforementioned straight vertical surface 125, so that while the lever still has its engagement on the plunger rod 89 bar and keeps to its bearing on the head of the screw blank, permitting the relative movement of the tubular holder and slotting blade so that such holder may telescopically embrace the head of the screw and a part of the anvil hub 60 for the most efficient working results. As the plunger upwardly retreats carrying the tubular slotting blade holder as one therewith, the action of the cam surface 126 relatively to the angular lever is such that while the tubular holder is withdrawing itself from the head of the screw and the hub-like anvil block thereunder, the screw, itself, is momentarily held in its place in the pocket of the carrier, and against being withdrawn as the slotting blade upwardly retreats, by the plunger rod 89 in engagement which for a sufficient time continues the extremity of the angle lever which acts as a retaining finger thereon. So soon as the plunger has become elevated to the extent that the roller of the angular lever reaches the straight vertical surface 125, the angular lever is then swung and the blade carrying bar is downwardly advanced to assume its normal position.

I employ a pair of slot forming devices as described in order to insure a perfect finish to the head of the screw by subjecting the screw head as it leaves the feeding mechanism first to one of the slotting mechanisms and then to the other; and it is evident that the blank passes from the feed chute into the pocket of the feed wheel, from thence it is expelled upon the down stroke of the punch gate by the ejector into one of the holders upon the dial or turret, whence it is carried by the rotation of the dial under the first of the pair of forming and slotting mechanisms; and upon the next down stroke of the head the screw head after its first operation is presented to the action of the second head and slot forming device; and thus the turret continues to revolve the feed wheel, presenting the blanks in regular order whence they are expelled into the holders and are then operated upon by the head forming and slotting devices. And to expel the blank from the holders of the turret after the head has been uniformly shaped and slotted, I provide the ejector which consists of the stem 95 of a size to correspond with the passage or opening in the holder and table, said stem being secured on the upper end of the rod 96 movable in the vertical guide 97 and having at its lower end a pin 98 engaging a bifurcation 99 in the outer end of the lever 100, fulcrumed at 101 upon the depending bracket 102; and said lever carries at its inner end the roller 103 traveling in the cam groove 104 of the wheel 105 mounted upon the shaft 106 bearing in the part 8 of the bracket 7 secured to the frame, the said shaft carrying gear wheel 47 for revolving cam or eccentric wheel through the medium of the vertical transmission shaft and train of gearing.

From the foregoing description taken in connection with the drawings the operation of the machine as a complete organization will be readily understood; and briefly stated, the hopper is supplied with the headed blanks and from the hopper the blanks pass into the supply chute one at a time; and at the lower or discharge end of the chute the blanks enter the pockets of the feed wheel with the head upstanding and the blank and the stem resting in said pocket. At this time one of the carriers on the turret is directly under one of the pockets of the feed wheel; the expelling device carried by the punch gate descends, and engaging the head of the blank expels it into the holder, which is then brought under the first of the head forming and slotting devices which surrounds the head and forms the slot therein, the head in this condition revolving and being acted upon by the next head forming and slotting device; and the turret continuing to revolve brings the completed blank with the head formed and slotted above the ejector, which moving upward engages the lower portion of the blank and forces it from the holder into the discharge or delivery device 107.

The parts of the mechanism are all timed and determined in order that the supply, the feed, the head forming and slotting, and the ejecting will be performed in regular order; and such number is determined by the size and arrangement of the star wheel, the number of holders in the drawing being shown as 10 to agree with the pockets of the star wheel.

I have provided a means to guide the headed blank from the feeding wheels to the holders, which while not absolutely necessary in my machine is a desirable adjunct to the organization of the parts; and this device is placed under the feeding wheel and comprises a vertical pedestal or supporting bracket 108 having attaching ears 109 for securing the device to the frame work; and upon said pedestal is mounted a plate 110 formed at one end with a block 111, said block being provided with a blank guiding opening 112.

Upon the plate is also pivoted the blank engaging levers 113 held in proper position by the spring 114; and in operation the screw under the impulse of the injector is conducted into the guiding opening 112 being held therein by the spring actuated lever 113, and from thence passes into the blank holder the spring actuated lever bearing only with sufficient tension to hold the blank from accidental displacement, but permitting it to readily enter the blank holder.

I claim:—

1. In a machine for slotting heads of screws, in combination, a horizontally movable carrier having upwardly open blank receiving cavities and means for intermittently advancing the carrier, a plunger head having its movement above the carrier, having a depending tubular and downwardly opening holder provided with a slotting blade rigidly supported in and carried by the holder and having its lower edge above the lower end of the tubular holder, a plunger rod in and vertically movable relatively to the holder, and a spring for upwardly retracting the plunger rod, a lever fulcrumed on the plunger head and having a member thereof coacting with the said plunger rod, and a fixed part of the machine having a cam surface with which a portion of said lever coacts whereby on the retreating movement of the plunger head and holder the plunger rod will continue in engagement with the screw blank to prevent same from being, by the slotting blade, withdrawn from the carrier.

2. In combination, a horizontally movable carrier having upwardly open blank receiving cavities, a plunger head reciprocating vertically relatively to the carrier having a holder provided with a downwardly opening passage therein, and with an affixed blade, a plunger rod vertically slidable in said passage relatively to and independently of the blade, the lower end of said blade being above the mouth at the bottom of said passage, a spring exerting an upward forcing movement on the plunger rod, and means for downwardly advancing the plunger rod relatively to its holder and the slotter blade at the beginning of the upward movement of the plunger head.

3. In a machine of the character described, the combination with a blank supply hopper, a chute or conveyer in comply munication therewith, a feed wheel having edgewise located and outwardly opening pockets to aline with the conveyer and to receive the blanks, a flange margined support under the feed wheel, having a recess in its flange in line with the chute and having a hole through its base in the circular path of the pockets, a carrier intermittently movable under the flanged support having blank receiving pockets to be brought successively coincident with said hole, means for downwardly forcing the blanks into the pockets, means coöperating with the carrier for slotting the heads of the blanks, and a blank guiding device having a location between the base of said flange margined support and the top of the carrier and comprising a spring pressed movable member at one side thereof.

4. In a machine of the character described, the combination of a frame, a hopper supported therein, a chute communicating with said hopper, means for taking the blanks from the hopper and conducting them to the chute, means for reciprocating said conductor consisting of a pivoted angle lever having one extremity connected with the conductor, a rod connected with the other end of the lever, a sleeve in which the lower end of said rod operates, a spring connected with the sleeve and rod, a disk to which the lower end of said sleeve is eccentrically connected, a shank carrying said disk, and means for revolving said shaft.

5. In a machine of the character described, the combination of a frame, a vertical shaft mounted therein, a disk provided with a cam or eccentric groove mounted on said shaft, a turret on said shaft, blank holders carried by said turret, a stem forming an ejector adapted to enter the holders from the under side and engaging the blank therein, a rod carrying said ejector, a guide for said rod, a lever having one end connected to said rod, a pin carried by the other end of the rod and engaging the cam groove of the disk and means for revolving the shaft to impart to the ejector a vertical reciprocation to cause the ejector to enter and expel the blank from the holders and to revolve the turret to bring the holders over the ejector.

6. In a machine of the character described, the combination with the feeding wheel, the injector for removing blanks from the feed wheel, a guide for guiding the blanks in their passage from the feeding wheel, and holders for receiving the blanks from the guide.

7. In a machine of the character described, the combination with a feed wheel provided with pockets to receive the headed blanks, means for forcing the blanks from the feed wheel, means for guiding the blanks consisting of a support having a guiding passage or opening therein, a spring controlled lever adjacent to said passage for engaging the blank, and holders to receive the blank from the guide.

Signed by me at Springfield, Mass., in presence of two subscribing witnesses.

GEORGE T. WARWICK.

Witnesses:
Wm. S. Bellam,
G. R. Driscoll.

Copies of this patent may be obtained for five cents each, by addressing the "Commissioner of Patents, Washington, D. C."